US009820300B2

(12) United States Patent
Kim et al.

(10) Patent No.: US 9,820,300 B2
(45) Date of Patent: Nov. 14, 2017

(54) METHOD AND APPARATUS FOR RECEIVING DOWNLINK FRAME IN WIRELESS LAN

(71) Applicant: LG ELECTRONICS INC., Seoul (KR)

(72) Inventors: Jeongki Kim, Seoul (KR); Kiseon Ryu, Seoul (KR); Giwon Park, Seoul (KR); Hangyu Cho, Seoul (KR); Suhwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 45 days.

(21) Appl. No.: 15/026,210

(22) PCT Filed: Oct. 10, 2014

(86) PCT No.: PCT/KR2014/009521
§ 371 (c)(1),
(2) Date: Mar. 30, 2016

(87) PCT Pub. No.: WO2015/053581
PCT Pub. Date: Apr. 16, 2015

(65) Prior Publication Data
US 2016/0255625 A1 Sep. 1, 2016

Related U.S. Application Data

(60) Provisional application No. 61/889,537, filed on Oct. 11, 2013, provisional application No. 61/895,375, (Continued)

(51) Int. Cl.
*H04W 72/14* (2009.01)
*H04W 72/04* (2009.01)
(Continued)

(52) U.S. Cl.
CPC ........ *H04W 72/14* (2013.01); *H04W 72/042* (2013.01); *H04W 72/0446* (2013.01);
(Continued)

(58) Field of Classification Search
CPC ... H04W 48/12; H04W 52/14; H04W 72/042; H04W 72/1273; H04W 72/1289; H04W 74/006; H04W 72/1294; H04W 72/14
See application file for complete search history.

(56) References Cited

U.S. PATENT DOCUMENTS 9,397,800 B2 * 7/2016 Ghaboosi ................ H04L 5/001
2005/0201319 A1 * 9/2005 Lee ........................ H04L 1/0073
370/321
(Continued)

FOREIGN PATENT DOCUMENTS

WO 2011108832 9/2011
WO 2011136567 11/2011
(Continued)

OTHER PUBLICATIONS

PCT International Application No. PCT/KR2014/009521, Written Opinion of the International Searching Authority dated Jan. 9, 2015, 2 pages.

*Primary Examiner* — Ashley Shivers
(74) *Attorney, Agent, or Firm* — Lee, Hong, Degerman, Kang & Waimey PC

(57) ABSTRACT

A method and an apparatus for receiving a downlink frame in a wireless LAN are disclosed. The method and apparatus for receiving a downlink frame in a wireless LAN may comprises the steps of: an STA receiving from an AP a downlink frame via a downlink dedicated channel; and the STA transmitting to the AP a response frame related to the downlink frame via the downlink dedicated channel. The downlink dedicated channel allows transmission only of a contention-free downlink frame by the AP and a response
(Continued)

frame by the STA, and restricts transmission of an independent uplink frame by the STA, wherein the independent uplink frame may be an uplink frame other than a response frame among uplink frames that are transmitted from the STA to the AP.

10 Claims, 12 Drawing Sheets

Related U.S. Application Data filed on Oct. 24, 2013, provisional application No. 61/901,406, filed on Nov. 7, 2013.

(51) Int. Cl.
*H04W 74/00* (2009.01)
*H04W 74/04* (2009.01)
*H04W 84/12* (2009.01)

(52) U.S. Cl.
CPC ......... *H04W 74/006* (2013.01); *H04W 74/04* (2013.01); *H04W 74/004* (2013.01); *H04W 84/12* (2013.01)

(56) References Cited

U.S. PATENT DOCUMENTS

2006/0153148 A1 7/2006 Bichot et al.
2009/0316811 A1* 12/2009 Maeda ................. H04L 1/1671
 375/260
2009/0318170 A1* 12/2009 Lee ....................... H04W 68/02
 455/458
2014/0328268 A1* 11/2014 Zhu ..................... H04W 74/002
 370/329

FOREIGN PATENT DOCUMENTS

WO 2012064117 5/2012
WO 2013077652 5/2013

* cited by examiner

FIG. 1
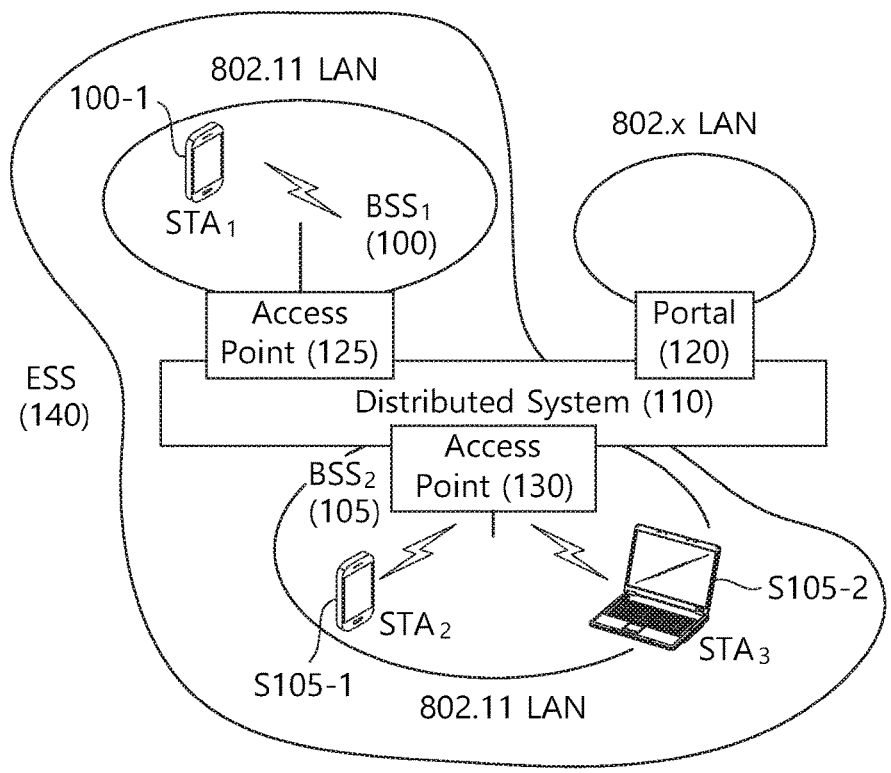
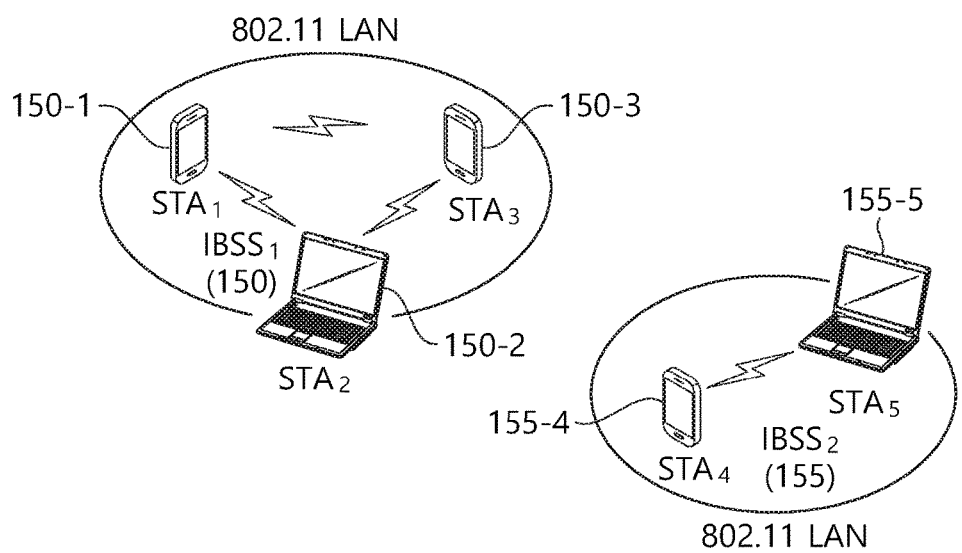

METHOD AND APPARATUS FOR RECEIVING DOWNLINK FRAME IN WIRELESS LAN

CROSS-REFERENCE TO RELATED APPLICATIONS

This application is the National Stage filing under 35 U.S.C. 371 of International Application No. PCT/KR2014/009521, filed on Oct. 10, 2014, which claims the benefit of U.S. Provisional Application Nos. 61/889,537 filed on Oct. 11, 2013, 61/895,375, filed on Oct. 24, 2013 and 61/901,406, filed on Nov. 7, 2013, the contents of which are all hereby incorporated by reference herein in their entirety.

BACKGROUND OF THE INVENTION

Field of the Invention

The present invention relates to wireless communication and, more particularly, to a method and an apparatus for receiving downlink frames in a WLAN (Wireless Local Area Network).

Related Art

The Wireless Next Generation Standing Committee (WNG-SC) of the IEEE 802.11 is an ad-hoc committee dealing with development of standard specifications of the next-generation WLAN technology in a long-term perspective.

At the IEEE meeting held on March 2013, Broadcom pointed out on the basis of the history of WLAN standardization that next-generation WLAN specifications following the IEEE 802.11ac should be discussed within the first half of the year of 2013, where the effective term of the IEEE 802.11ac standard is ended. Agreeing with the needs for the next-generation technology and standardization thereof, the WNG-SC has approved the motion for forming a study group for the next-generation WLAN at the IEEE meeting held on March 2013.

The technical scope of the IEEE 802.11ax mainly dealt with in the study group for the next-generation WLAN which is called the IEEE 802.11ax or High Efficiency WLAN (HEW) includes: 1) improvement of the 802.11 PHY (Physical) layer and Medium Access Control (MAC) layer at the frequency bands of 2.4 GHz, 5 GHz, and so on; 2) improvement of spectrum efficiency and area throughput; and 3) improvement of performance in indoor and outdoor environments such as an environment with interference sources, a dense heterogeneous network environment, and an environment with high user loads. A use-case scenario mostly used in the IEEE 802.11ax assumes an environment populated with a large number of Access Points (APs) and stations (STAs), and the IEEE 802.11ax is concerned with technologies capable of improving spectrum efficiency and area throughput under such an environment. In particular, the IEEE 802.11ax has an interest in improving actual performance in outdoor environments traditionally not having been dealt with in the existing WLAN specifications, as well as performance improvement in indoor environments.

The IEEE 802.11ax has great interests in such scenarios as those including wireless office, smart home, stadium, hotspot, or building/apartment, and on the basis of the corresponding scenarios, technical specifications capable of improving system performance in an environment populated with a large number of APs and STAs are being discussed.

It is expected that the IEEE 802.11ax will be more actively involved in the discussion about improvement of system performance in an Overlapping Basic Service Set (OBSS) environment, performance enhancement in an outdoor environment, and cellular off-loading than performance enhancement of a single link for one Basic Service Set (BSS). Such direction of the IEEE 802.11ax indicates that the next-generation WLAN technology is going to have technical specifications the scope of which overlaps with that of mobile communication technology. Taking into account the current situation where mobile communication and WLAN technologies are being investigated together in the areas of small cell and Direct-to-Direct (D2D) communication, technical and entrepreneurial fusion of the next-generation WLAN and mobile communication will be conducted more actively.

SUMMARY OF THE INVENTION

An objective of the present invention is to provide a method for receiving downlink frames in a wireless local area network (WLAN).

Another objective of the present invention is to provide an apparatus for receiving downlink frames in a WLAN.

To achieve the objectives of the present invention, a method for receiving a downlink frame in a WLAN according to one aspect of the present invention comprises an STA (station)'s receiving the downlink frame from an Access Point (AP) through a downlink-oriented channel and the STA's transmitting a response frame in response to the downlink frame to the AP through the downlink-oriented channel, wherein the downlink-oriented channel allows only contention-free transmission of the downlink frame by the AP and transmission of the response frame by the STA and restricts transmission of an independent uplink frame by the STA; and the independent uplink frame is an uplink frame rather than the response frame among uplink frames transmitted to the AP from the STA.

To achieve the objective of the present invention, an STA (station) receiving a downlink frame in a WLAN according to another aspect of the present invention comprises a Radio Frequency (RF) unit for transmitting or receiving a radio signal and a processor connected operatively to the RF unit, wherein the processor is configured to receive the downlink frame from an AP through a downlink-oriented channel and to transmit a response frame in response to the downlink frame to the AP through the downlink-oriented channel, wherein the downlink-oriented channel allows only contention-free transmission of the downlink frame by the AP and transmission of the response frame by the STA and restricts transmission of an independent uplink frame by the STA; and the independent uplink frame is an uplink frame rather than the response frame among uplink frames transmitted to the AP from the STA.

An AP attempting to transmit a downlink frame by configuring a separate channel for receiving downlink frames can transmit a downlink frame to an STA by avoiding channel access contention with the STA. Therefore, the present invention can improve transmission rate of downlink frames.

BRIEF DESCRIPTION OF THE DRAWINGS

FIG. 1 is a concept view illustrating the structure of a wireless local area network (WLAN).

DESCRIPTION OF EXEMPLARY EMBODIMENTS

Figure 2:
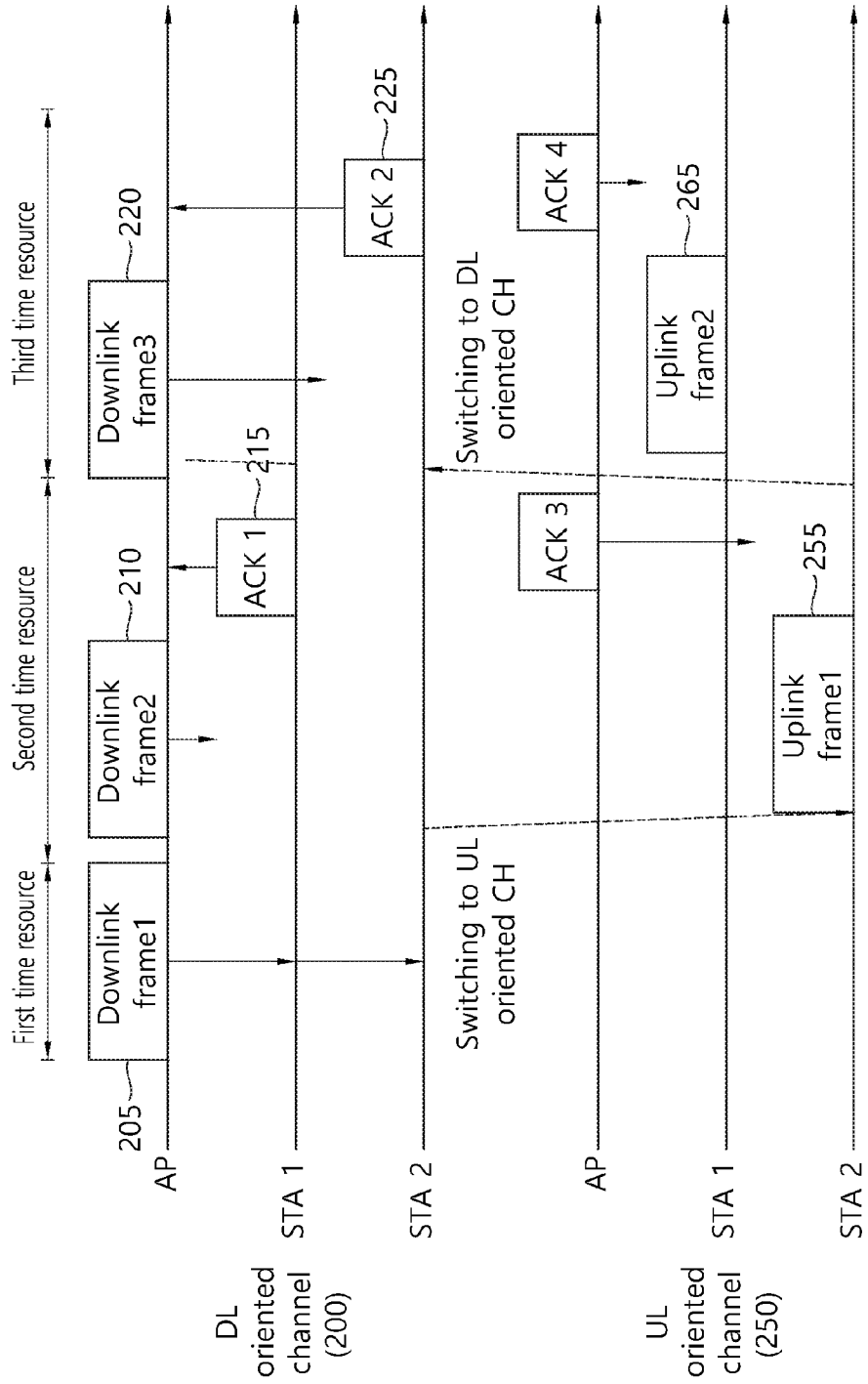
FIG. 2 illustrates a WLAN channel according to an embodiment of the present invention.

FIG. 1 is a concept view illustrating the structure of a wireless local area network (WLAN).

The upper part of FIG. 1 shows the structure of the IEEE (institute of electrical and electronic engineers) 802.11 infrastructure network.

Referring to the upper part of FIG. 1, the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 230 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

The lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4, and 155-5 are managed in a distributed manner. In the IBSS, all of the STAs 150-1, 150-2, 150-3, 155-4, and 155-5 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

The IEEE 802.11ax specification assumes a network with a high density (such as stadium, station, and exhibition). In the existing WLAN, the amount of downlink data transmitted from an AP to an STA is relatively larger than the amount of uplink data transmitted from an STA to an AP and is continuously increasing.

However, in a current WLAN, an AP performs contention (for example, Enhanced Distributed Channel Access (EDCA)) for accessing the same channel with STAs to transmit downlink frames. Thus in a network with a high density, collision between an AP and STAs can be easily increased, and at the time of a downlink data transmission failure of an AP, the size of a contention window can be increased exponentially, leading to degradation of transmission efficiency of downlink data. Moreover, in a network with a high density, a large amount of traffic and a long Transmission Opportunity (TXOP) can increase contention and collision.

In what follows, described will be a method for increasing throughput of downlink data according to an embodiment of the present invention.

FIG. 2 illustrates a WLAN channel according to an embodiment of the present invention.

FIG. 2 illustrates communication between an AP and STAs based on a downlink-oriented channel (or downlink dedicated channel) and an uplink-oriented channel (or uplink dedicated channel).

In the downlink-oriented channel shown in FIG. 2, transmission of a downlink frame and transmission of a response frame in response to the downlink frame can be performed. In an uplink-oriented channel, transmission of an uplink frame and transmission of a response frame in response to the uplink frame can be performed. The uplink frame transmitted in an uplink-oriented channel may be called an independent uplink frame. Among uplink frames, an independent uplink frame can indicate an uplink frame rather than the response frame with respect to a downlink frame. An AP can perform transmission or reception of a frame in a downlink-oriented channel and an uplink channel respectively by using the individual RF units.

An STA configures a downlink-oriented channel as a default operation channel and receives a downlink frame from an AP through a downlink-oriented channel and transmits a response frame (for example, an ACK (Acknowledgement) frame) to the AP in response to the downlink frame. If the STA has pending uplink data, the STA switches the operation channel from the downlink-oriented channel to the uplink-oriented channel and transmits an uplink frame through the uplink-oriented channel. If transmission with respect to an uplink frame is completed, the STA switches from the uplink-oriented channel to the downlink-oriented channel which is the default operation channel and monitors a downlink frame transmitted on the downlink-oriented channel. To put differently, a downlink-oriented channel allows only the contention-free transmission of the downlink frame by the AP and transmission of the response frame by the STA and restricts transmission of an independent uplink frame by the STA.

With reference to FIG. 2, for example, the AP can transmit downlink frame1 205 to STA1 and STA2 in the first time resources through the downlink-oriented channel 200 according to the broadcast/multicast scheme.

Also, in the second time resources, the AP can transmit the downlink frame2 210 through the downlink-oriented channel 200 according to the unicast scheme, and STA1 can transmit ACK frame1 215 which is a response frame with respect to the downlink frame2 210 through the downlink-oriented frame 200.

In case STA2 has a pending uplink frame to be transmitted to the AP in the second time resources, STA2 can change the operation channel from the downlink-oriented channel 200 to the uplink-oriented channel 250 while the AP is performing transmission of the downlink frame2 210 to STA1. For example, STA2 obtains transmission duration of the downlink frame2 210 and transmits the uplink frame1 200 by performing channel access through the uplink-oriented channel 250 during the transmission duration of the downlink frame2 210. After the transmission duration of the downlink frame2 210, the STA2 can switch again to the downlink-oriented channel 200, the default operation channel.

The STA2 can transmit an uplink frame to the AP through the uplink-oriented channel 250 by performing channel access on the time resources overlapping with the second time resources. To change the operation channel from the downlink-oriented channel 200 to the uplink-oriented channel 250, the STA2 may perform separate signaling to the AP to indicate switching to the uplink-oriented channel 250 or may switch the operation channel to the uplink-oriented channel 250 without separate signaling.

In the same way, in case the STA2 has a pending downlink frame to be transmitted to the AP, the AP can transmit the downlink frame2 220 through the downlink-oriented channel 200 on the third time resources according to the unicast scheme. To receive the downlink frame3 220 transmitted from the AP on the third time resources, the STA2 can change the operation channel from the uplink-oriented channel 250 to the downlink-oriented channel 200. For example, as described above, after the transmission duration of the downlink frame2 210, the STA2 can change the operation channel from the uplink-oriented channel 250 to the downlink-oriented channel 200 without separate signaling (or frame) which indicates (or indicates change of the operation channel) that the AP has a pending downlink frame with respect to the STA2. Similarly, the STA2 may change the operation channel from the uplink-oriented channel 250 to the downlink-oriented channel 200 by using separate signaling (or frame) which indicates (or indicates change of the operation channel) that the AP has a pending downlink frame.

In the same way, in case the STA1 has a pending uplink frame to be transmitted to the AP, the STA1 can perform channel access by changing the operation channel from the downlink-oriented channel 200 to the uplink-oriented channel 250 during the third time resources in which transmission of the downlink frame2 220 from the AP to the STA2 is performed. The STA1 can transmit the uplink frame2 265 to the AP through the uplink-oriented channel 250 on the time resources overlapping with the third time resources.

According to an embodiment of the present invention, in STA1 and STA2's performing switching the operation channel, the STAs can switch from a downlink-oriented channel to an uplink-oriented channel without transmission of signaling (or frame) for channel switching or can switch from the downlink-oriented channel to the uplink-oriented channel by using signaling (or frame) for channel switching.

For example, the STA can switch from the downlink-oriented channel to the uplink-oriented channel without transmitting the signaling for channel switching to the AP. In this case, the AP can detect the STA's switching of the operation channel from the downlink-oriented channel to the uplink-oriented channel on the basis of the uplink frame transmitted by the STA through the uplink-oriented channel. In this case, taking into account the STA's transmission end time for an uplink frame, the AP may not transmit a downlink frame to the STA through the downlink-oriented channel for a predetermined time period. Similarly, taking into account the transmission end time of a downlink frame to the other STA, the AP may not transmit a downlink frame to the STA through the downlink-oriented channel for a predetermined time period. Taking into account the transmission end time of an uplink frame and/or transmission end time of a downlink frame to the other STA, the STA can switch again to the downlink-oriented channel which is the default operation channel. In other words, the AP and the STA can assume the downlink-oriented operation channel as the default operation channel, and the STA can perform switching between the downlink-oriented channel and the uplink-oriented channel without signaling for channel switching.

In another example, the STA may switch the operation channel from the downlink-oriented channel to the uplink-oriented channel on the basis of the signaling for channel switching. In this case, the STA can transmit the signaling for informing of switching of the operation channel to the AP before switching the operation channel to the uplink-oriented channel. A frame for signaling for switching of the operation channel from the downlink-oriented frame to the uplink-oriented channel can be termed as an uplink-oriented channel switching notification frame. On the contrary, a frame for signaling for the STA's switching of the operation channel from the uplink-oriented channel to the downlink-oriented channel can be termed as a downlink-oriented channel switching notification frame. The uplink-oriented channel switching notification frame and the downlink-oriented channel switching notification frame can be transmitted through a channel before channel switching or through a channel after channel switching, respectively.

For example, before switching from the downlink-oriented channel to the uplink-oriented channel, the STA can transmit an uplink-oriented channel switching notification frame to the AP through the downlink-oriented channel. On the other hand, after switching to the uplink-oriented channel from the downlink-oriented channel, the STA may transmit an uplink-oriented channel switching notification frame through the uplink-oriented channel. Also, after switching from the uplink-oriented channel to the downlink-oriented channel, the STA can transmit a downlink-oriented channel switching notification frame to the AP through the downlink-oriented channel. Similarly, the STA can transmit a downlink-oriented channel switching notification frame to the AP through the uplink-oriented channel before performing switching to the downlink-oriented channel from the uplink-oriented channel. For example, the downlink-oriented channel switching notification frame can be a frame which requests transmission of a pending downlink frame from the AP, such as the Power Saving (PS)-poll frame.

When switching the operation channel to the uplink-oriented channel or to the downlink-oriented channel, the STA can transmit to the AP duration information which indicates how long the STA stays in the switched channel. For example, the uplink switching notification frame can include switching duration information, and the switching duration information can include information about the time period during which the STA stays in the uplink-oriented channel. The STA can stay in the uplink-oriented channel or in the downlink-oriented channel for the duration indicated by the duration information.

In case the STA attempts to stay in an additionally switched uplink-oriented channel or downlink-oriented channel, the STA may extend the duration for which the STA stays in a switched uplink-oriented channel or a downlink-oriented channel by configuring additional duration.

Also, the AP can command the STA to perform channel switching as follows.

The AP can transmit to the STA an uplink polling frame and a downlink polling frame for requesting (or polling) channel switching. For example, in case the AP attempts to receive an uplink frame from the STA through the uplink-oriented channel, the AP can transmit an uplink polling frame to the STA. Also, in case the AP has a downlink frame to be sent to the STA, the AT can transmit a downlink polling frame to the STA. The downlink polling frame can comprises an STA indicator and time resource (duration) information for transmission of a downlink frame after polling for downlink transmission. Also, the uplink polling frame can comprise an STA indicator and time resource (duration) information for transmission of an uplink frame after polling for uplink transmission.

For example, in case the STA stays in the uplink-oriented channel, the AP can transmit a downlink polling frame to the STA through the uplink-oriented channel. The STA which has received the downlink polling frame can switch the operation channel to the downlink-oriented channel. After switching the operation channel to the downlink-oriented channel from the uplink-oriented channel, the STA can transmit to the AP a downlink-oriented channel switching notification frame which notifies of switching of the operation channel to the downlink-oriented channel. For example, the STA can transmit a PS-poll frame to the AP through the downlink-oriented channel, and the AP can transmit a pending downlink frame to the STA in response to the PS-poll frame. On the other hand, before switching the operation channel to the downlink-oriented channel from the uplink-oriented channel, the STA can transmit to the AP a downlink-oriented channel switching notification frame (for example, PS-poll frame) through the uplink-oriented channel.

On the other hand, in case the STA stays in the downlink-oriented channel, the AP can transmit an uplink polling frame to the STA through the downlink-oriented channel. The STA which has received the uplink polling frame can switch the operation channel to the uplink-oriented channel. After switching the operation channel to the uplink-oriented channel, the STA can transmit to the AP an uplink frame that the AP has requested.

As shown in FIG. 2, in case the downlink-oriented channel and the uplink-oriented channel are configured separately, frames can be transmitted or received through the downlink-oriented channel as follows.

Through the downlink-oriented channel, the AP can transmit a data frame, management frame which is broadcast (for example, a beacon frame or a Traffic Indication Map (TIM) broadcast frame), part of a control frame (for example, a Request-To-Send (RTS) frame), part of a management frame (for example, an association response frame), and BlockAck Request (BAR) frame with respect to downlink data.

Also, through the downlink-oriented channel, the STA can transmit a response frame in response to a frame transmitted through the downlink-oriented channel such as an ACK frame, block ACK frame, Clear-To-Send (CTS) frame, and sounding feedback frame.

Also, the AP can transmit an uplink polling frame, which is used for requesting transmission of uplink data through the uplink-oriented channel, to the STA through the downlink-oriented channel. The STA which has received the uplink polling frame can perform Channel Clear Assessment (CCA) by switching to the uplink-oriented channel and transmit an uplink frame to the AP through EDCA-based contention.

Also, through the downlink-oriented channel, the STA can transmit to the AP an uplink-oriented channel switching notification frame which notifies of switching of the operation channel to the uplink-oriented channel.

As shown in FIG. 2, in case the downlink-oriented channel and the uplink-oriented channel are configured separately, frames can be transmitted or received through the uplink-oriented channel as follows.

Through the uplink-oriented channel, the STA can transmit a data frame, part of a control frame (for example, an uplink Request-To-Send (RTS) frame or PS-poll frame), and part of a management frame (for example, a probe request frame/link request frame).

Through the uplink-oriented channel, the AT can transmit a response frame (for example, an ACK frame, block ACK frame, or CTS frame) in response to the uplink frame transmitted by the STA.

Also, through the uplink-oriented channel, the AP can transmit to the STA a downlink polling frame which informs of transmission of downlink data through the downlink-oriented channel, The STA which has received the downlink polling frame can monitor a downlink frame transmitted to the STA by switching to the downlink-oriented channel and performing CCA.

Also, through the uplink-oriented channel, the STA can transmit to the AP a downlink-oriented channel switching notification frame which informs of switching of the operation channel to the downlink-oriented channel.

Figure 3:
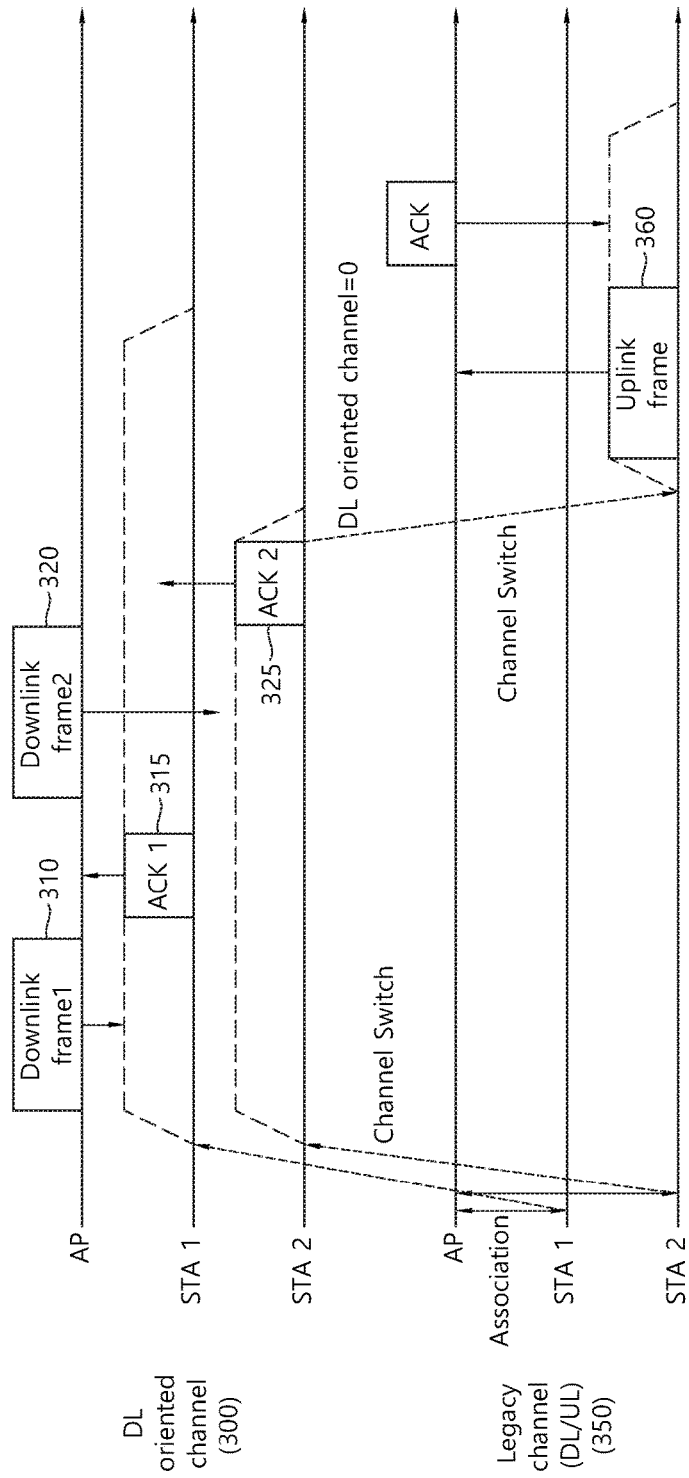
FIG. 3 illustrates a WLAN channel according to an embodiment of the present invention.

FIG. 3 illustrates a WLAN channel according to an embodiment of the present invention.

FIG. 3 illustrates a method for communicating between an AP and an STA by using a downlink-oriented channel and a legacy channel.

The downlink-oriented channel of FIG. 3 performs transmission of a downlink frame from the AP to the STA and transmission of a response frame in response to the downlink frame from the STA to the AP. The legacy channel ca perform transmission or reception operation for an uplink frame or a downlink frame respectively between the legacy STA and the AP. The legacy channel may not permit reception of a downlink frame by the HEW STA which supports the IEEE 802.11ax (in other words, transmission of a downlink frame to the HEW STA). In other words, the AP can transmit a downlink frame to the legacy STA through the legacy channel and transmit a downlink frame to the HEW STA through the downlink-oriented channel. The legacy STA is the STA which does not support the IEEE 802.11ax but supports the existing WLAN standard (for example, the IEEE 802.11ac, IEEE 802.11a, IEEE 802.11b, IEEE 802.11g, and IEEE 802.11n). The legacy channel can be the primary channel of the AP while the downlink-oriented channel can be one of the secondary channels of the AP.

According to another embodiment of the present invention, transmission and reception of frames between the HEW STA and the AP through the legacy channel may not be restricted. In this case, the legacy channel can be used as a normal channel for transmission or reception of a frame by the HEW STA and legacy STA.

The legacy STA and the HEW STA can be associated with the AP by performing the initial access through the legacy channel. After being associated with the AP, the HEW STA can operate by configuring the downlink-oriented channel as the default operation channel. In case the HEW STA has a pending uplink frame to be transmitted to the AP, the HEW STA can change the operation channel from the downlink-oriented channel to the legacy channel and transmit the uplink frame through the legacy channel.

With reference to FIG. 3, STA1 and STA2 are assumed to be HEW STAs. After being associated with the AP, the STA1 and STA2 can receive a downlink frame1 310 from the AP through the downlink-oriented channel 300. The AP can transmit the downlink frame1 310 to the STA1 according to the unicast scheme and receive an ACK frame1 315 from the STA1. Also, the AP can transmit a downlink frame2 320 to the STA2 according to the unicast scheme and receive an ACK frame2 325 from the STA2. In case the STA2 has a pending uplink frame 360, the STA2 can change the operation channel to the legacy channel 350, after which the STA2 can transmit the uplink frame 360 to the AP through the legacy channel 350.

The STA2 can switch to the uplink channel from the downlink-oriented channel 300 without using signaling for switching of the operation channel between STAs. In case the AP receives an uplink frame from an STA through the legacy channel 350, the AP determines that the STA is in the legacy channel 350 and may suspend transmitting a downlink frame (for example, an RTS frame and data frame) to the STA through the downlink-orientation channel 300.

On the other hand, as described with reference to FIG. 2, the STA can transmit a legacy channel switching notification frame to the AP before changing the operation channel to the legacy channel from the downlink-oriented channel. The legacy channel switching notification frame can be used to command the STA to switch the operation channel from the downlink-oriented channel to the legacy channel. Also, the STA can indicate switching of the operation channel from the legacy channel to the downlink-oriented channel through a downlink-oriented channel switching notification frame.

In the same way, the AP can transmit an uplink polling frame through the downlink-oriented channel to request transmission of an uplink frame to the STA through the legacy channel. On the contrary, the AP can transmit a downlink polling frame to the STA to request reception of a downlink frame through the legacy channel.

In the following embodiments of the present invention, the uplink-oriented channel and the legacy channel of FIGS. 2 and 3 may be termed as non-downlink oriented channels. Also, the uplink-oriented channel notification frame and the legacy channel switching notification frame may be terms as non-downlink oriented channel notification frames.

Figure 4:
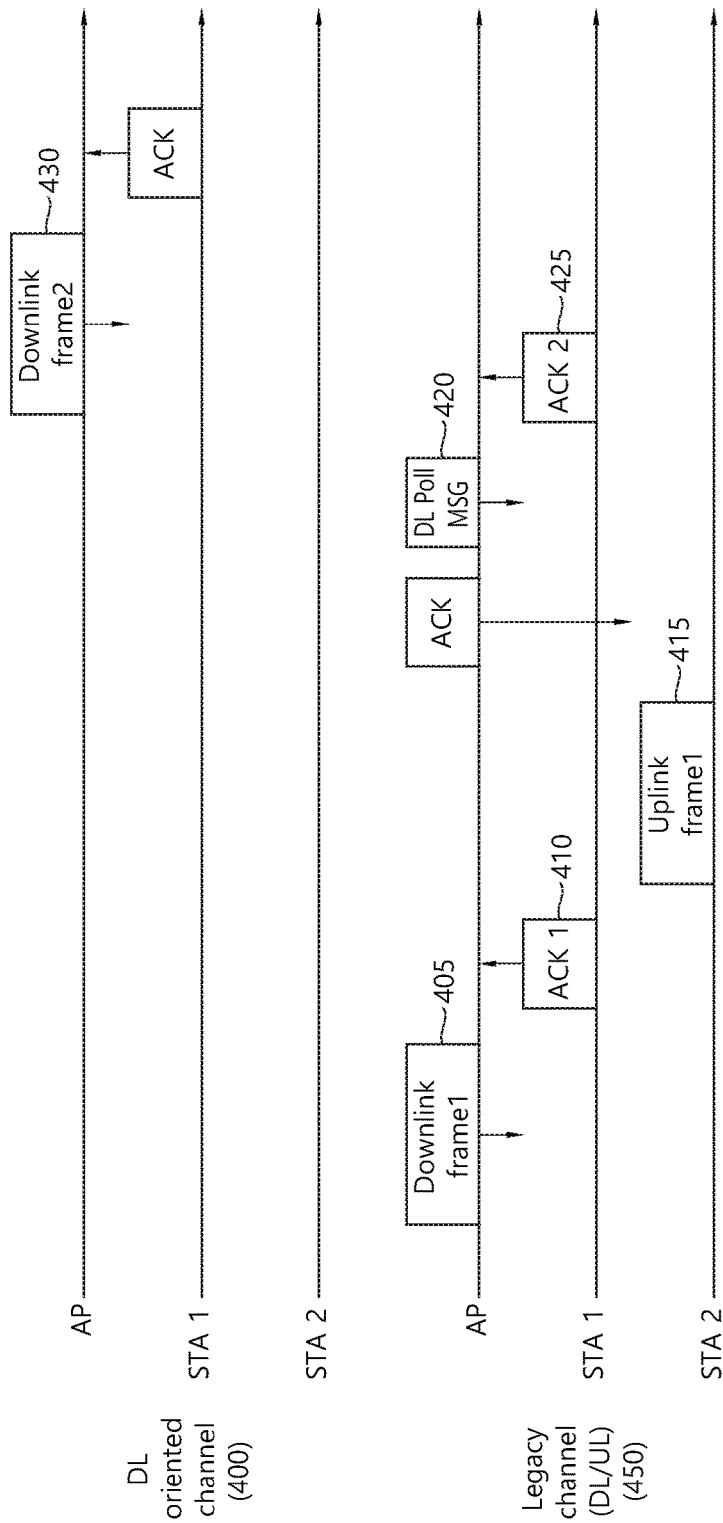
FIGS. 4 and 5 illustrates a WLAN channel according to an embodiment of the present invention.
Figure 5:
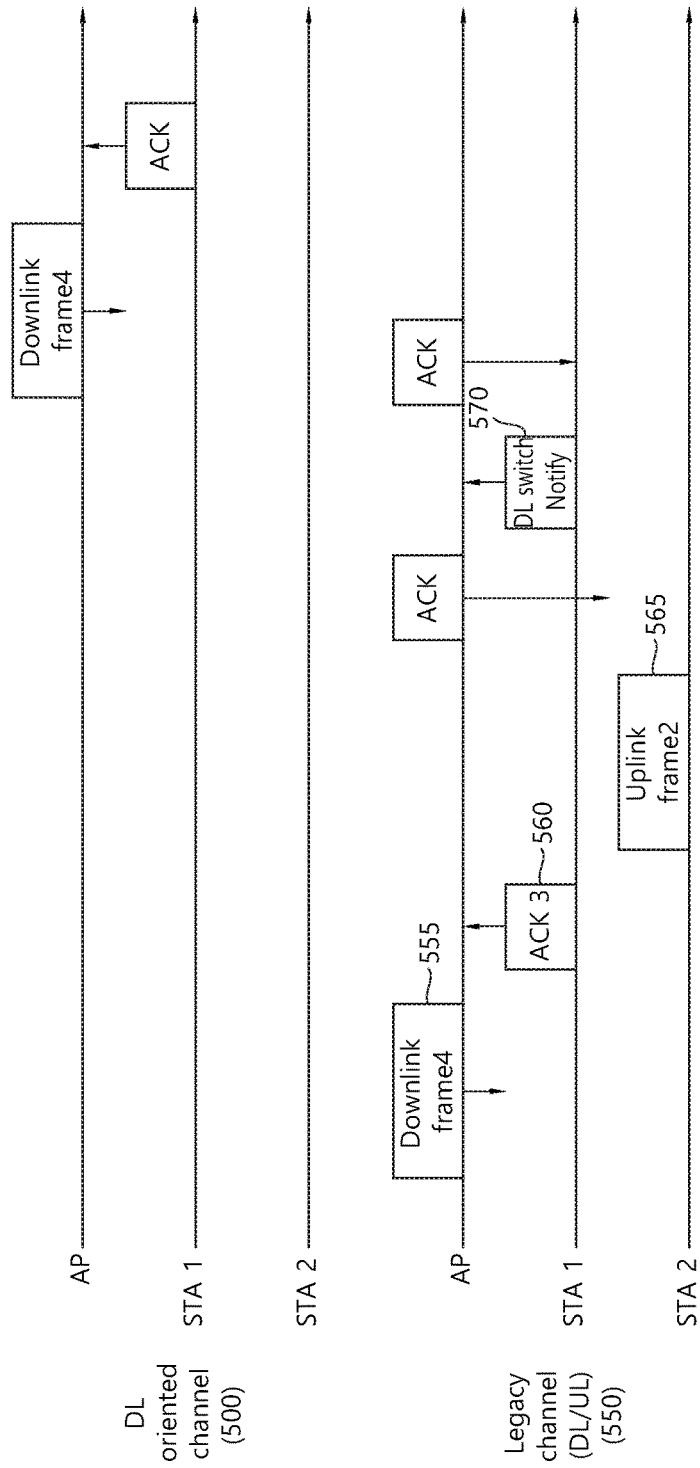

FIGS. 4 and 5 illustrates a WLAN channel according to an embodiment of the present invention.

FIGS. 4 and 5 illustrate a method for communicating between an AP and an STA by using a downlink-oriented channel and a legacy channel.

The downlink-oriented channel disclosed in FIGS. 4 and 5 can perform transmission of a downlink frame from an AP to an STA and transmission of a response frame in response to the downlink frame from the STA to the AP. The legacy channel can perform transmission or reception operation for an uplink frame or a downlink frame between a legacy STA and the AP. FIG. 3 illustrates the case where the legacy channel allows a HEW STA supporting the IEEE 802.11ax to receive a downlink frame.

If a HEW STA is allowed to receive a downlink frame through the legacy channel, the HEW STA can receive a polling frame for transmission of the downlink frame through the legacy channel. For example, in case the AP has a pending downlink frame to be transmitted to the HEW STA, the AP can transmit a downlink polling frame to the HEW STA through the legacy channel. In case existence of a pending downlink frame in the AP is indicated by the downlink polling frame, the STA can change the operation channel to the downlink-oriented channel and receive the downlink frame through the downlink-oriented channel.

With reference to FIG. 4, STA1 and STA2 can be HEW STAs. The AP can transmit a downlink frame1 405 to the STA1 through the legacy channel 450 according to the unicast scheme and receive an ACK frame1 410 with respect to the downlink frame1 405 from the STA1. Also, the AP can receive an uplink frame1 415 from the STA2. Also, the AP can transmit a downlink polling frame 420 to the STA1 through the legacy channel 450. The STA1 receiving the downlink polling frame 420 can transmit an ACK frame2 425 to the AP and switch the operation channel to the downlink-oriented channel 400. The STA1 can receive the downlink frame2 430 from the AP through the downlink-oriented channel 400.

Similarly, with reference to FIG. 5, an STA can change the channel for receiving a downlink frame without using a separate downlink polling frame. Now, the STA1 and the STA2 are assumed to be HEW STAs. The AP can transmit a downlink frame3 555 to the STA1 through the legacy channel 550 according to the unicast scheme and receive an ACK frame3 560 with respect to the downlink frame3 555 from the STA1. Also, the AP can receive an uplink frame2 565 from the STA2. Also, the STA1 can transmit a downlink-oriented channel switching notification frame 570 to the AP through the legacy channel 550 and switch the operation channel to the downlink-oriented channel 500.

Similarly, as described with reference to FIG. 2, the STA can transmit a legacy channel switching notification frame to the AP before changing the operation channel to the legacy channel from the downlink-oriented channel. The legacy channel switching notification frame can command the STA to switch the operation channel from the downlink-oriented channel to the legacy channel.

In the same way, the AP can transmit an uplink polling frame through the downlink-oriented channel to request transmission of an uplink frame to the STA through the legacy channel. On the contrary, the AP can transmit a downlink polling frame to the STA to request reception of a downlink frame through the downlink-oriented channel.

As shown in FIGS. 4 and 5, through the downlink-oriented channel, the AP can transmit a data frame (real-time data such as A/V streaming data and VoIP data), and specific control frame (RTS frame or BAR frame). In other words, taking into account the characteristics of the data transmitted through a downlink frame (for example, whether the data require real-time transmission), the AP can determine whether to transmit the data through the legacy channel or through the downlink-oriented channel.

Figure 6:
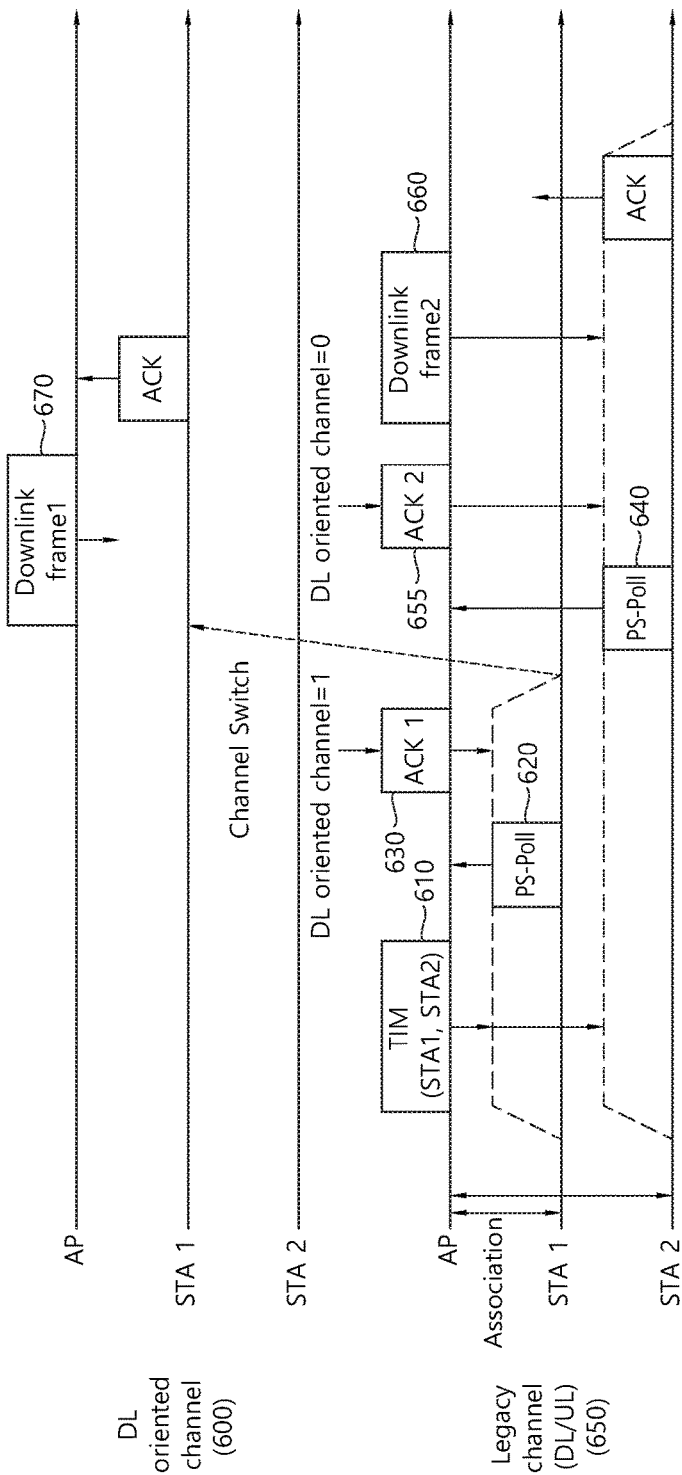
FIG. 6 illustrates a WLAN channel according to an embodiment of the present invention.

FIG. 6 illustrates a WLAN channel according to an embodiment of the present invention.

FIG. 6 illustrates a method for communicating between an AP and an STA by using a downlink-oriented channel and a legacy channel.

With reference to FIG. 6, STAs operating in the power saving mode can check existence of downlink data to be received from the AP by using a Traffic Indication Map (TIM) that the STAs have received while staying in the legacy channel. TIM can include information about existence of downlink data to be received by the STAs. The TIM can be included in a beacon frame transmitted by the AP.

In case the STA confirms existence of downlink data to receive by using the TIM, the STA can switch the operation channel to the downlink-oriented channel. After the STA's channel switching, the AP can transmit downlink data to the STA through the downlink-oriented channel.

In case the size of downlink data to transmit is small, the AP can transmit the downlink data through the legacy channel to reduce overhead due to channel switching of the STA. An indicator about whether to transmit the downlink data through the legacy channel or through the downlink-oriented channel can be transmitted from the AP to the STA.

FIG. 5 assumes that STA1 and STA2 are HEW STAs. After being associated with the AP, the STA1 and STA2 can operate in the power saving mode. The STA1 and STA2 can operate in the legacy channel by configuring the legacy channel as the operation channel.

The STA1 and STA2 can determine existence of downlink data to receive from the AP by using the TIM 610 received from the AP through the legacy channel. In case the TIM 610 indicates existence of downlink data to be transmitted to the STA1 and STA2, each of the STA1 and STA2 can request transmission of a downlink frame from the AP by transmitting a PS-poll frame 620, 640 through the legacy channel 650. The STA1 can transmit the PS-poll frame 620 through the legacy channel and receive an ACK frame1 630 from the AP through the legacy channel. The ACK frame that the STA receives can include information about a channel through which the STA receives a downlink frame.

For example, the ACK frame can include a downlink receiving channel indicator. In case the downlink receiving channel indicator is 1, reception of a downlink frame through the downlink-oriented channel can be indicated. On the contrary, in case the downlink receiving channel indicator is 0, reception of a downlink frame through the legacy channel can be indicated.

The downlink receiving channel indicator of the ACK frame1 630 transmitted to the STA1 by the AP can indicate 1. In case the downlink receiving channel indicator indicates 1, the STA1 can switch the operation channel to the downlink-oriented channel 600 and receive the downlink frame1 670 from the AP by monitoring the downlink-oriented channel 600.

The downlink receiving channel indicator of the ACK frame2 655 transmitted to the STA2 by the AP can indicate 0. In case the downlink receiving channel indicator is 0, the STA2 can receive the downlink frame2 660 transmitted through the legacy channel 650 from the AP without switching the operation channel. The downlink receiving channel indicator may be transmitted being included in a frame transmitting the TIM (for example, beacon frame).

According to another embodiment of the present invention, in case the ACK frame does not include a downlink receiving channel indicator, the STA may switch the downlink channel according to the STA's capability. For example, suppose the STA1 is a HEW STA, and the STA2 is a legacy STA. In case the STA1 which is a HEW STA receives an ACK frame with respect to a PS poll frame through a legacy channel, the STA1 can operate by changing the operation channel to the downlink-oriented channel. The AP can transmit a downlink frame through the downlink-oriented channel with respect to the STA1 which is a HEW STA. In case the STA2 which is a legacy STA receives an ACK frame with respect to a PS poll frame, the STA2 can receive a downlink frame on a legacy channel instead of changing the operation channel to the downlink-oriented channel. The AP can transmit a downlink frame to the STA2 which is a legacy STA through a legacy channel.

In other words, the STA can receive a downlink frame through an operation channel corresponding to the STA's capability by using the ACK frame even in the case where no specific indicator for changing the operation channel is used.

According to an embodiment of the present invention, information about the downlink-oriented channel can be transmitted to the STA through a frame (for example, beacon frame or probe response frame) for the initial access transmitted from the AP. For example, information about the downlink-oriented channel can include information about whether the downlink-oriented channel is supported, index of a channel configured as a downlink-oriented channel, and information about bandwidth of the downlink-oriented channel.

Taking into account network load, the AP can use the frequency band by dividing it to a legacy channel and a downlink-oriented channel or allocate the frequency band entirely for the legacy channel. For example, in the case of a high density network comprising a large number of STAs with respect to the channel bandwidth of 40 MHz, the AP may allocate 20 MHz of the channel bandwidth to the legacy channel while allocating the remaining 20 MHz of the channel bandwidth to the downlink-oriented channel. In this case, the AP can transmit information about configuration of the downlink-oriented channel to the STA through the beacon frame.

On the contrary, in the case of a low density network, the whole 40 MHz of channel bandwidth can be used for the legacy channel. In this case, the AP can transmit information about whether configuration of the downlink-oriented channel is released or the downlink-oriented channel is not used to the STA through the beacon frame.

The network density can be determined in various ways. For example, the network density can be determined by the number of uplink frames transmitted from a plurality of STAs, time ratio during which a channel is busy, or the number of associated STAs.

Figure 7:
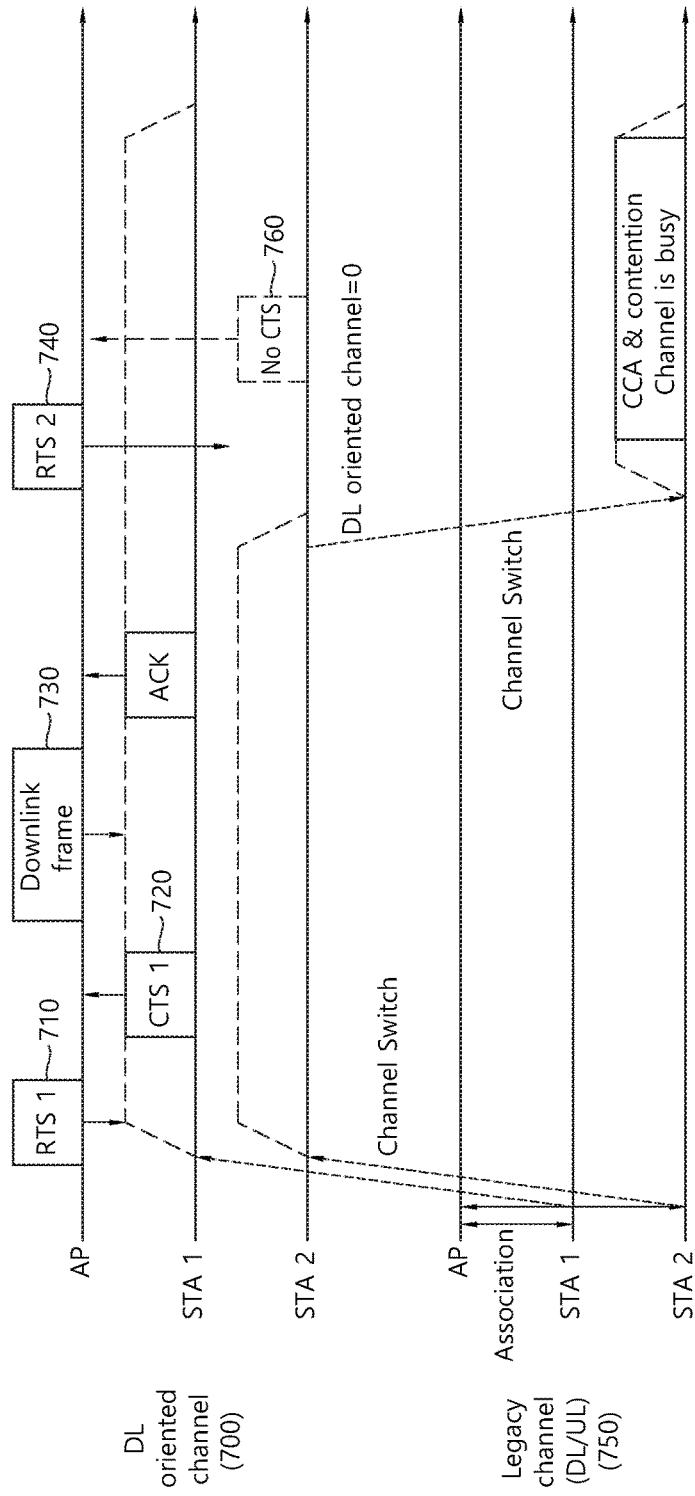
FIG. 7 illustrates a method for an AP to transmit downlink frames according to an embodiment of the present invention.

FIG. 7 illustrates a method for an AP to transmit downlink frames according to an embodiment of the present invention.

An STA can configure a legacy channel as the operation channel for transmission of an uplink frame. FIG. 7 illustrates a method for checking whether a current operation channel of the STA is a downlink-oriented channel before transmitting a downlink frame to the STA through the downlink-oriented channel.

With reference to FIG. 7, the AP can determine whether the current operation channel is a downlink-oriented channel from transmission or reception of the RTS/CTS frame in conjunction with the STA.

The AP can transmit an RTS frame1 710 to the STA1 through the downlink-oriented channel 700 to transmit the downlink frame 730 to the STA1 through the downlink-oriented channel 700. The STA1 which has received the RTS frame1 710 from the AP through the downlink-oriented channel 700 can transmit a CTS frame1 720 to the AP through the downlink-oriented channel 700. The AP which has received the CTS frame1 720 can transmit the downlink frame 730 to the STA1 according to the unicast scheme and receive an ACK frame with respect to the downlink frame 730 from the STA1.

Also, the AP can transmit an RTS frame2 740 to the STA2 through the downlink-oriented channel. The STA2 may have switched the operation channel from the downlink-oriented channel to the legacy channel to transmit the uplink frame. Therefore, the STA2 is unable to receive the RTS frame2 740 from the AP and unable to transmit the CTS frame2 760 in response to the RTS frame2 740 to the AP. In this case, the AP may not transmit a downlink frame through the downlink-oriented channel.

In case the default operation channel of the STA2 is a downlink-oriented channel, the STA2 can switch again to the downlink-oriented channel without signaling for channel switching after transmission of the uplink frame. After transmitting a downlink frame to another STA, the AP can transmit the RTS frame again to the STA2 and determine whether the STA2 has switched to the downlink-oriented channel.

Similarly the STA2 can transmit a downlink switching notification frame to the AP at the time of switching from the legacy channel to the downlink-oriented channel. The AP can transmit a downlink frame to the STA2 through the downlink-oriented channel after receiving the downlink switching notification frame from the STA2.

Meanwhile, the AP can transmit a downlink polling frame used for informing of transmission of downlink data through the downlink-orientation channel to the STA2 through the legacy channel. The STA2 which has received the downlink polling frame can switching the operation channel to the downlink-oriented channel from the legacy channel.

According to an embodiment of the present invention, information informing of change of the operation channel may be transmitted being piggybacked on the uplink frame transmitted through the legacy channel. For example, the uplink frame transmitted by the STA2 can include information indicating change of the operation channel from the legacy channel to the downlink-oriented channel.

Figure 8:
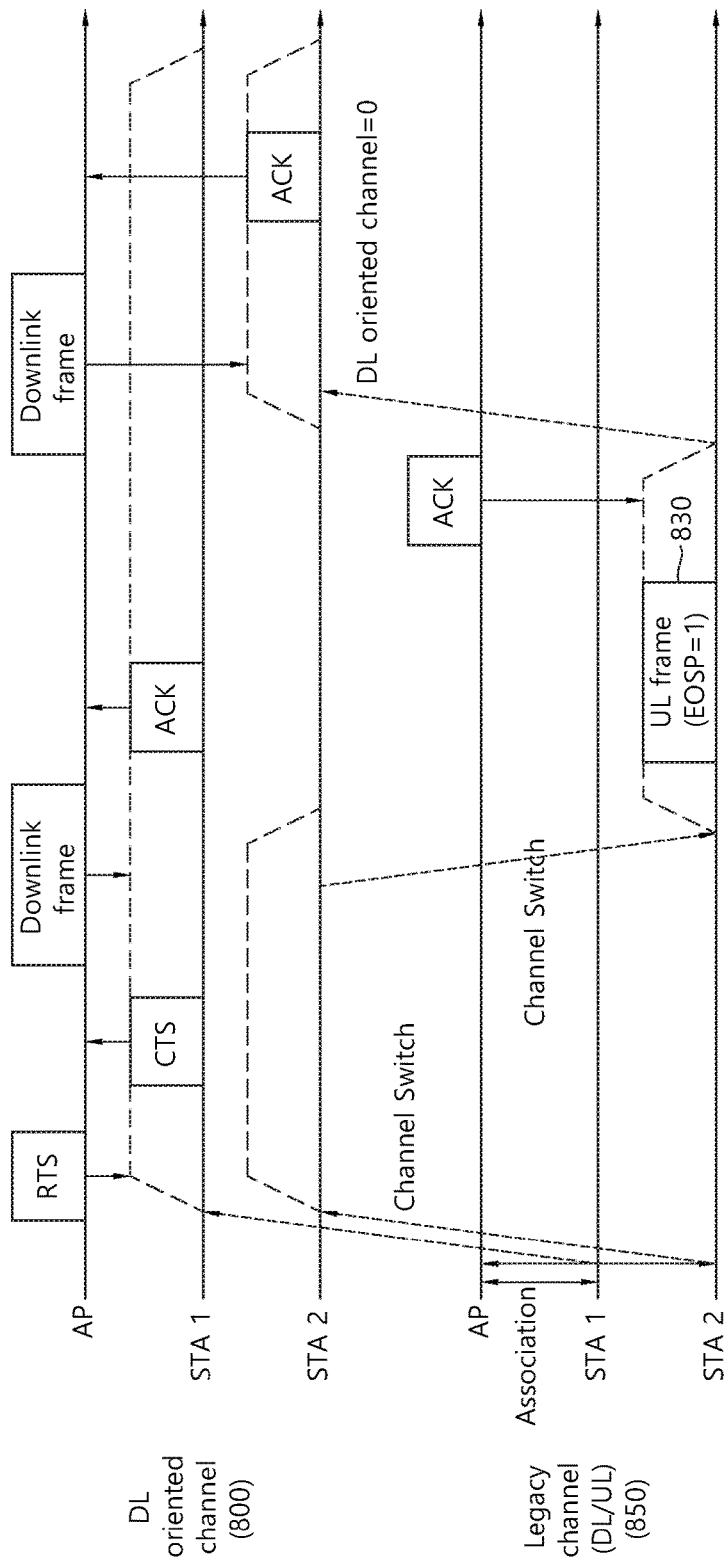
FIG. 8 illustrates switching of an operation channel of an STA according to an embodiment of the present invention.

FIG. 8 illustrates switching of an operation channel of an STA according to an embodiment of the present invention.

FIG. 8 illustrates the case where information informing of change of the operation channel is piggybacked on an uplink frame.

With reference to FIG. 8, STA2 can switch the operation channel from a downlink-oriented channel 700 to a legacy channel 750 for transmission of an uplink frame. The STA2 can transmit the uplink frame to the AP through the legacy channel. The STA2 can indicate change of the operation channel from the legacy channel to the downlink-oriented channel on the basis of the uplink frame.

According to an embodiment of the present invention, an EOSP (End Of Service Period) indicator which indicates the end of operation in the legacy channel through the MAC (Medium Access Control) header of an uplink frame or through the PHY header of the PPDU which delivers an uplink frame can be configured. The PHY header can include a PLCP (Physical Layer Convergence Protocol) preamble and PLCP header. For example, in case the EOSP indicator of the uplink frame 830 is 1, the EOSP indicator can indicate end of transmission of the uplink frame in the legacy channel and change of the operation channel to the downlink-oriented channel. On the contrary, if the EOSP indicator is 0, transmission of the uplink frame in the legacy channel can be indicated. In other words, this indicates that the legacy channel is maintained as the operation channel of an STA.

Figure 9:
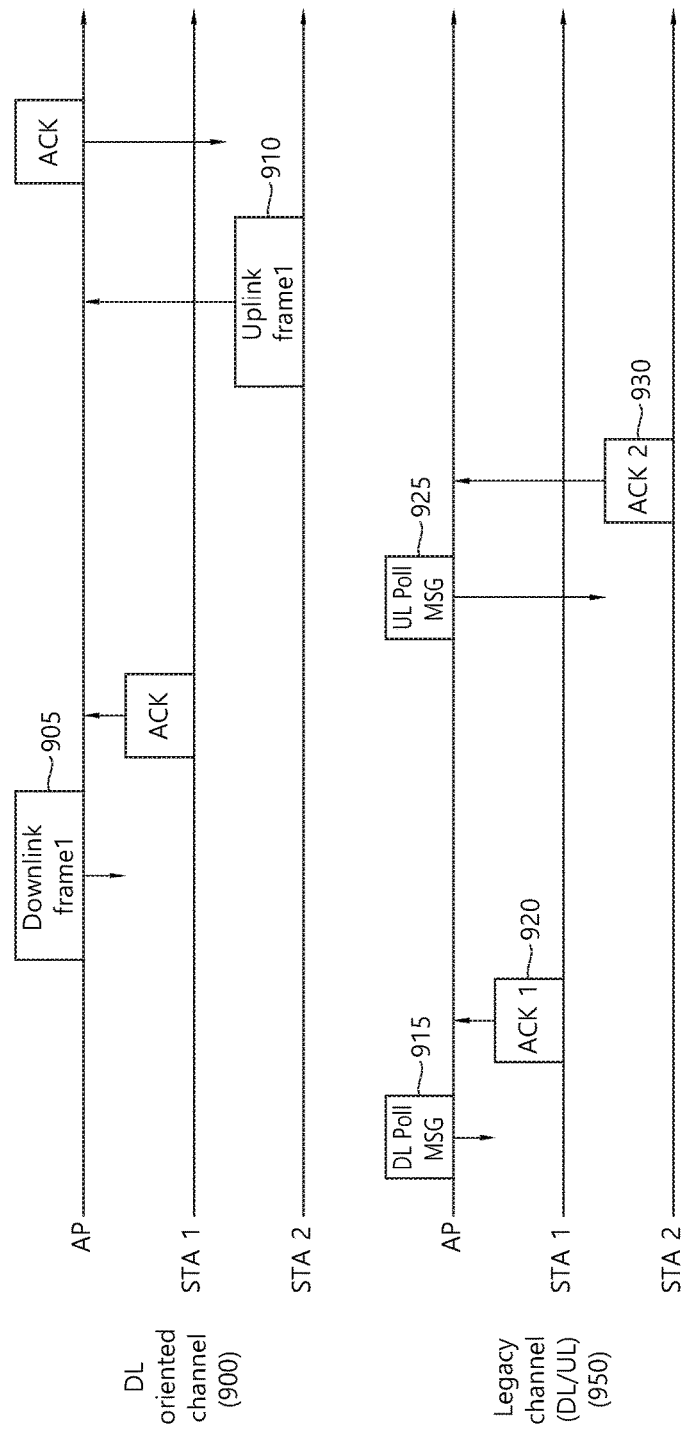
FIGS. 9 and 10 illustrate operation of an STA in a downlink-oriented channel according to an embodiment of the present invention.
Figure 10:
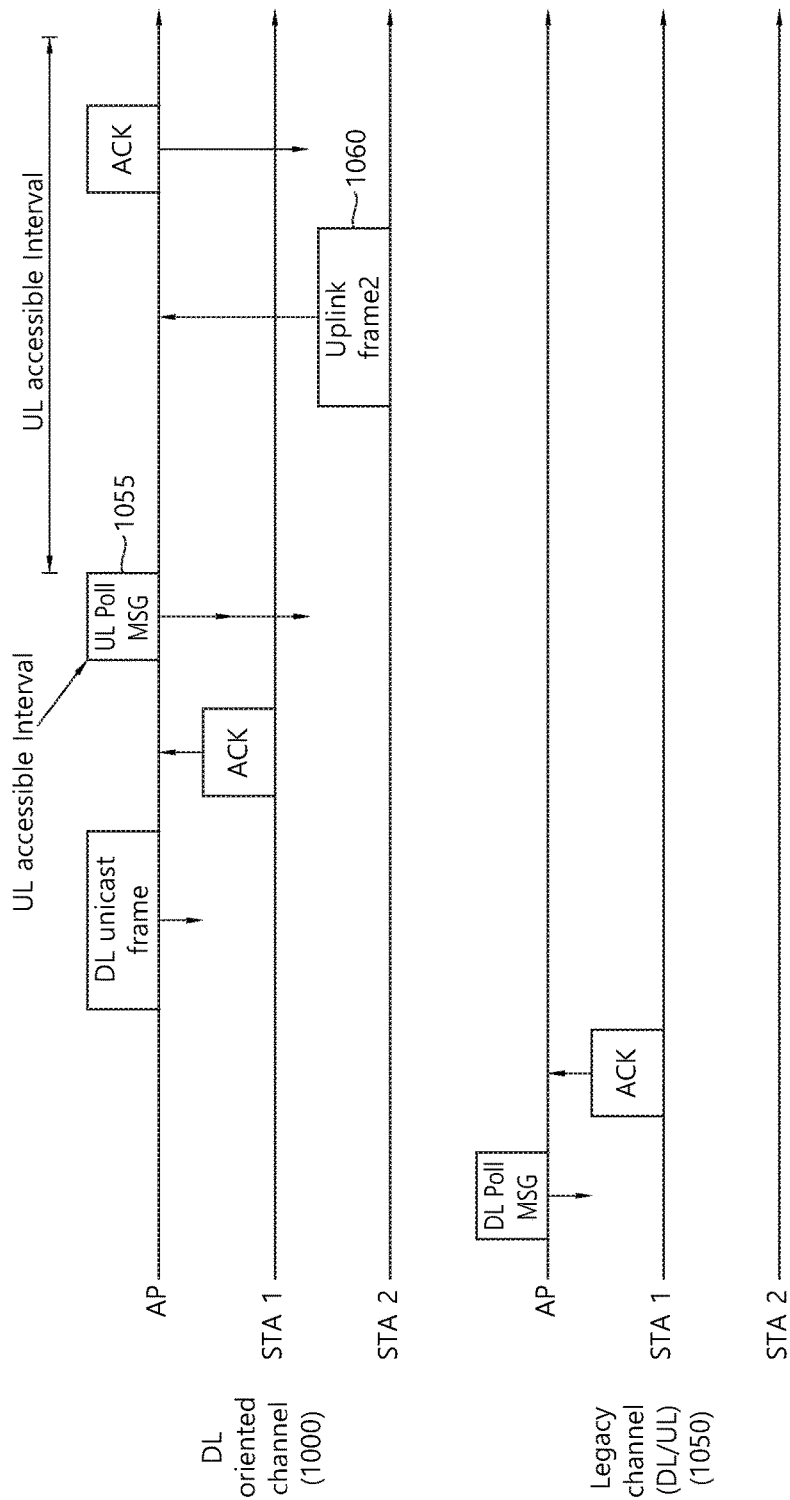

FIGS. 9 and 10 illustrate operation of an STA in a downlink-oriented channel according to an embodiment of the present invention.

FIGS. 9 and 10 illustrate a method for an AP to allow independent transmission of an uplink frame as well as a response frame in response to a downlink frame through a downlink-oriented channel. In other words, an STA can transmit a data frame, part of a control frame (for example, an uplink RTS frame or PS-poll frame), and part of a management frame (for example, probe request frame/link quest frame) through the downlink-oriented channel to the uplink. Such an uplink frame can be termed as an independent uplink frame. The independent uplink frame may not be a response frame with respect to a downlink frame.

For example, if the downlink-oriented channel is in the idle state, the AP can allow the STA to transmit an independent uplink frame.

The AP can transmit an uplink polling frame requesting transmission of an independent uplink frame to the STA. The uplink polling frame can allow at least one STA to transmit an independent uplink frame through the downlink-oriented channel.

For example, in case the channel is in the idle state, the AP can transmit to the STA information about time resource during which transmission of an independent uplink frame through the downlink-oriented channel is allowed. The time resource during which transmission of an independent uplink frame is allowed can be termed as an independent uplink frame transmission time resource.

The time resource during which transmission of an independent uplink frame is allowed can be transmitted to the STA through explicit or implicit signaling by the AP. For example, information about time resource during which transmission of the independent uplink frame is allowed can be transmitted to the STA through a beacon frame or a frame containing information about an independent uplink frame transmission time resource or a frame on which information about the independent uplink frame transmission time resource is piggybacked.

The STA operating in the downlink-oriented channel can transmit the independent uplink frame to the AP through the independent uplink frame transmission time resource. Among the STAs operating in the downlink-oriented channel, an STA having a pending uplink frame can transmit the independent uplink frame to the AP through the downlink-oriented channel by performing channel access on the independent uplink frame transmission time resource.

For example, the STA can determine whether to transmit the independent uplink frame on the independent uplink frame transmission time resource by taking into account the size of the independent uplink frame transmission time resource. In case the duration for transmission of the independent uplink frame is shorter than or equal to the independent uplink frame transmission time resource, the STA can transmit the independent uplink frame through the downlink-oriented channel by performing channel access on the independent uplink frame transmission time resource without necessarily switching the operation channel to the legacy channel to transmit an uplink frame.

On the contrary, if the duration for transmission of the independent uplink frame is longer than the independent uplink frame transmission time resource, the STA can change the operation channel from the downlink-oriented channel to the legacy channel for transmission of an uplink frame and transmit the uplink frame to the AP through the legacy channel.

The STA, being requested to transmit an uplink frame on the time resource during which transmission of the independent uplink frame is allowed, may transmit the uplink frame through the downlink-oriented channel.

With reference to FIG. 9, the AP can transmit a downlink polling frame 915 to STA1 through the legacy channel 950. Receiving the downlink polling frame 915, the STA1 can transmit the ACK frame1 920 to the AP, switch the operation channel to the downlink-oriented channel 900, and receive the downlink frame1 905 from the AP through the downlink-oriented channel 900.

Also, the AP can transmit the uplink polling frame 925 to the STA2 through the legacy channel 950. Receiving the uplink polling frame 925, the STA2 can transmit the ACK frame2 930 to the AP, switch the operation channel to the downlink-oriented channel 900, and transmit the uplink frame1 910 to the AP on the independent uplink frame transmission time resource through the downlink-oriented channel 900.

With reference to FIG. 10, in case the operation channel of the STA2 is the downlink-oriented channel 1000, the STA2 can receive the uplink polling frame 1055 through the downlink-oriented channel 1000. Receiving the uplink polling frame 1055, the STA2 can transmit the uplink frame2 1060 to the AP through the downlink-oriented channel on the independent uplink frame transmission time resource.

As shown in FIG. 10, through the downlink-oriented channel, the AP can transmit a data frame (real-time data such as A/V streaming data and VoIP data) and a specific control frame (RTS frame, BAR frame, or ACK frame with respect to the independent uplink frame). Also, through the downlink-oriented channel, the STA can transmit a response frame with respect to a downlink frame (for example, ACK frame with respect to the data frame, BA frame or CTS frame with respect to the RTS frame, and sounding feedback frame) and the independent uplink frame.

Transmission or reception of a downlink frame or an uplink frame between the legacy STA and the AP can be performed through the legacy channel. Also, the AP can facilitate reception of a downlink frame and transmission of an uplink frame through the downlink-oriented channel by transmitting a downlink polling frame or uplink polling frame to the STA which operates in the legacy channel. In case the STA has a pending downlink data to transmit, the AP can transmit a downlink polling frame to the STA through the legacy channel. Receiving the downlink polling frame, the STA can switch the operation channel to the downlink-oriented channel as described above and receive a downlink frame transmitted by the AP by monitoring the downlink-oriented channel.

On the contrary, the AP can transmit the uplink polling frame to the STA. In case at least one STA is allowed to transmit the independent uplink frame through the downlink-oriented channel on the basis of the uplink polling frame, the STA can switch the operation channel to the downlink-oriented channel as described above, perform channel access by monitoring the downlink-oriented channel, and transmit the uplink frame through the downlink-oriented channel.

A polling frame based on one format may be used to determine whether an uplink/downlink indicator included in the polling frame indicates downlink polling or uplink polling.

For example, the polling frame can include an uplink/downlink indicator, STA indicator, information about TXOP, and period.

The uplink/downlink indicator can indicate whether the polling is intended for uplink or downlink transmission.

The STA indicator can include information indicating an STA supposed to receive polling for uplink transmission or polling for downlink transmission.

Information about TXOP can include time resource (duration) information for transmission of an uplink frame after polling for uplink transmission or time resource (duration) information for transmission of a downlink frame after polling for downlink transmission.

Also, in case an uplink polling frame is indicated on the basis of the uplink/downlink indicator, the information about TXOP can include information about whether to allow at least one STA to allow transmission of an independent uplink frame through the downlink-oriented channel.

Although the downlink-oriented channel is configured for individual frequency resources in the embodiments of FIGS. 2 to 10, the downlink-oriented time sources may be configured according to individual time resources. For example, a first time resource may be configured as a time resource oriented for transmission of a downlink frame, and a second time resource may allow transmission of both of a downlink frame and an uplink frame or allow transmission of an uplink frame only.

Also, according to an embodiment of the present invention, the downlink-oriented operation channel may be allocated to a plurality of STAs on the basis of OFDMA (Orthogonal Frequency Division Multiplexing Access). The AP can transmit a downlink frame to a plurality of STAs according to the OFDMA scheme by using one RF unit. For example, the AP can use 20 MHz from the downlink-oriented operation channel of 40 MHz to transmit a downlink frame to STA1 while allocating the remaining 20 MHz to transmit a downlink frame to STA2.

Figure 11:
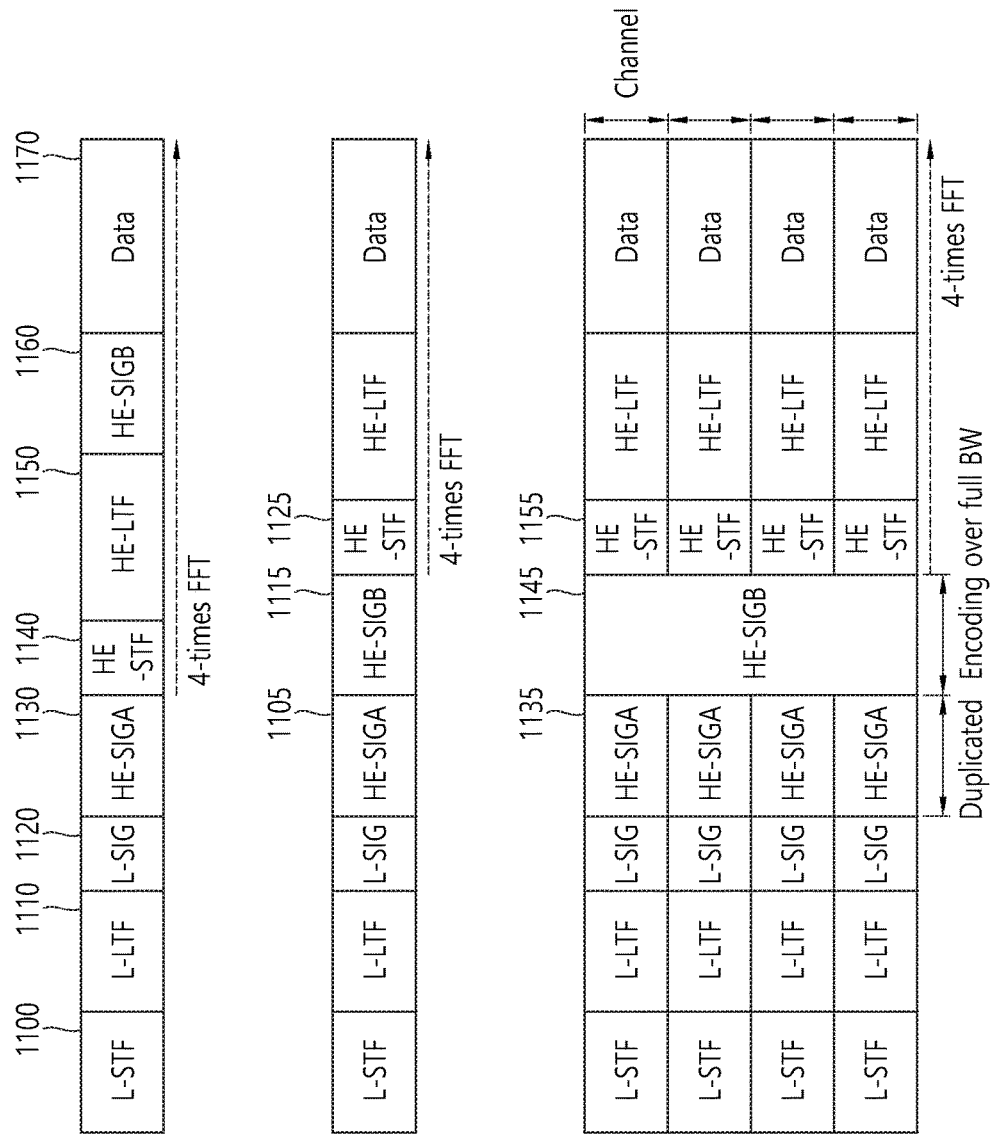
FIG. 11 illustrates a PPDU format for performing transmission of downlink frames through a downlink-oriented channel according to an embodiment of the present invention.

FIG. 11 illustrates a PPDU format for carrying out transmission of a downlink frame through a downlink-oriented channel according to an embodiment of the present invention.

FIG. 11 illustrates the PPDU format supporting the IEEE 802.11ax specifications. The PHY header of the PPDU format can include information for carrying out transmission of a downlink frame through a downlink-oriented channel.

With reference to FIG. 11, the PHY header of the downlink PPDU can include L-STF (legacy-short training field), L-LTF (legacy-long training field), L-SIG (legacy-signal), HE-SIG A (high efficiency-signal A), HE-STF (high efficiency-short training field), HE-LTF (high efficiency-long training field), and HE-SIG B (high efficiency-signal-B). The elements ranging from the PHY header to the L-SIG can be denoted by the legacy part while those elements after the L-SIG can be denoted by the HE (High Efficiency) part.

The L-STF 1100 can include a short training OFDM (Orthogonal Frequency Division Multiplexing) symbol. The L-STF 1100 can be used for frame detection, AGC (Automatic Gain Control), diversity detection, and coarse frequency/time synchronization.

The L-LTF 1120 can include a long training OFDM symbol. The L-LTF 1120 can be used for fine frequency/time synchronization and channel estimation.

The L-SIG 1140 can be used for transmission of control information. The L-SIG 1140 can include information about data rate and data length.

According to an embodiment of the present invention, the HE-SIG 1130 can include an EOSP (End Of Service Period)

indicator. The EOSP indicator can indicate end of the operation in the legacy channel. If the EOSP indicator is 1, it indicates end of transmission of an uplink frame in the legacy channel and switching of the operation channel to the downlink-oriented operation channel. On the other hand, if the EOSP indicator is 0, it indicates transmission of an uplink frame in the legacy channel. In other words, it indicates that the legacy channel is retained as the operation channel of an STA.

Also, the HE-SIG A 1130 can include information about the size of the channel configured as the downlink-oriented operation channel. The downlink-oriented operation channel can be configured to be a channel set to one of 20 MHz, 40 MHz, 80 MHz and 160 MHz, and a downlink frame can be transmitted through the downlink-oriented operation channel.

Also, if the downlink-oriented operation channel is allocated to a plurality of STAs according to the OFDMA (Orthogonal Frequency Division Multiplexing Access) scheme, the HE-SIG A 930 can include information about a downlink-oriented operation channel allocated to each of the plurality of STAs. The downlink-oriented operation channel can include a plurality of lower downlink-oriented operation channels. For example, from the downlink-oriented operation channel of 40 MHz, 20 MHz of the channel can be allocated to a first lower downlink-oriented operation channel used for transmitting a downlink frame to the STA1 while the remaining 20 MHz can be allocated to a second lower downlink-oriented operation channel for transmitting a downlink frame to the STA2.

The HE-STF 1140 can be used to improve AGC (Automatic Gain Control) estimation in the MIMO or OFDMA environment.

The HE-LTF 1150 can be used to estimate a channel in the MIMO or OFDMA environment.

The HE-SIG B 1160 can include information about length MCS (Modulation and Coding Scheme) of the PSDU (Physical Layer Service Data Unit) with respect to each STA and tail bits.

The size of IFFT applied to the fields after the HE-STF 1140 and that of IFFT applied to the fields before the HE-STF 1140 may differ from each other. For example, the IFFT size applied to the HE-STF 1140 and the fields following the HE-STF 1140 can be four times the size of the IFFT applied to the fields before the HE-STF 1140. The STA can be signaled to receive the HE-SIG A 1140 and to receive the downlink PPDU according to the HE-SIG A 1130. In this case, the STA can perform decoding on the basis of the new FFT size for the HE-STF 1140 and the fields following the HE-STF 1140. On the other hand, if the STA is not signaled to receive the downlink PPDU on the basis of the HE-SIG A 1130, the STA can stop decoding and perform NAV (Network Allocation Vector) configuration. The CP (Cyclic Prefix) of the HE-STF 1140 can be larger than the CPs of other fields, and during the CP period, the STA can perform decoding of the downlink PPDU by varying the FFT size.

The order of fields constituting the PPDU format as shown in the upper part of FIG. 11 may change. For example, as shown in the middle of FIG. 11, the HE-SIG B 1115 of the HE part may be disposed right after the HE-SIG A 1105. The STA can perform decoding up to the HE-SIG A 1105 and HE-SIG B 1115 to receive control information required and perform NAV configuration. In the same way, the IFFT size applied to the HE-STF 1125 and the fields following the HE-STF 1125 can be different from the IFFT size applied to the fields before the HE-STF 1125.

The STA can receive the HE-SIG A 1105 and the HE-SIG B 1115. In case reception of a downlink PPDU is signaled by the STA identifier field of the HE-SIG A 1105, the STA can perform decoding of the downlink PPDU by changing the FFT size from since the HE-STF 1125. On the contrary, in case the HE-SIG A 1105 is received, but reception of a downlink PPDU is not signaled according to the HE-SIG A, the STA can perform NAV (Network Allocation Vector) configuration.

The lower part of FIG. 11 illustrates a downlink PPDU format for DL (Downlink) MU (Multi-User) transmission. A downlink PPDU can be transmitted to the STA through different downlink transmission resources (frequency resources or spatial streams). In other words, a downlink PPDU can be transmitted to a plurality of STAs through a lower downlink-oriented channel included in the downlink-oriented channel. On the downlink PPDU, the fields preceding the HE-SIG B 1145 can be transmitted being duplicated from different downlink resources. Those fields following the HE-SIG B 1145 can include information for each of the plurality of STAs receiving the downlink PPDU.

In case the fields included in the downlink PPDU are transmitted separately through the respective downlink transmission resources, CRCs for the respective fields can be included in the downlink PPDU. On the contrary, if a specific field included in the downlink PPDU is transmitted being encoded across the whole downlink transmission resources, CRCs for the respective fields may not be included in the downlink PPDU. Therefore, overhead due to CRC can be reduced. In other words, the downlink PPDU format for DL MU transmission according to an embodiment of the present invention can reduce the CRC overhead of a downlink frame by using the HE-SIG B 1145 encoded across the whole transmission resources.

For example, suppose the AP has transmitted a downlink PPDU according to the DL MU OFDMA transmission scheme through the downlink-oriented channel. In case the bandwidth of one lower downlink-oriented channel is 20 MHz, the STA can receive downlink transmission resources by decoding the HE-SIG A transmitted through one lower downlink-oriented channel. For example, the HE-SIG A can indicate that the bandwidth of the downlink-oriented channel allocated to the STA is 80 MHz, and the STA can decode the fields after the HE-SIG A transmitted through the downlink-oriented channel of 80 MHz.

In the same way, the HE-STF 1155 and the fields after the HE-STF 1155 of the downlink PPDU format for DL MU transmission can be encoded on the basis of IFFT size different from the IFFT size applied for the fields before the HE-STF 1155. Therefore, in case the STA receives the HE-SIG A 1135 and HE-SIG B 1145 and is signaled to receive the downlink PPDU according to the HE-SIG A 1135, the STA can perform decoding of the downlink PPDU by varying the FFT size from since the HE-STF 1155.

Figure 12:
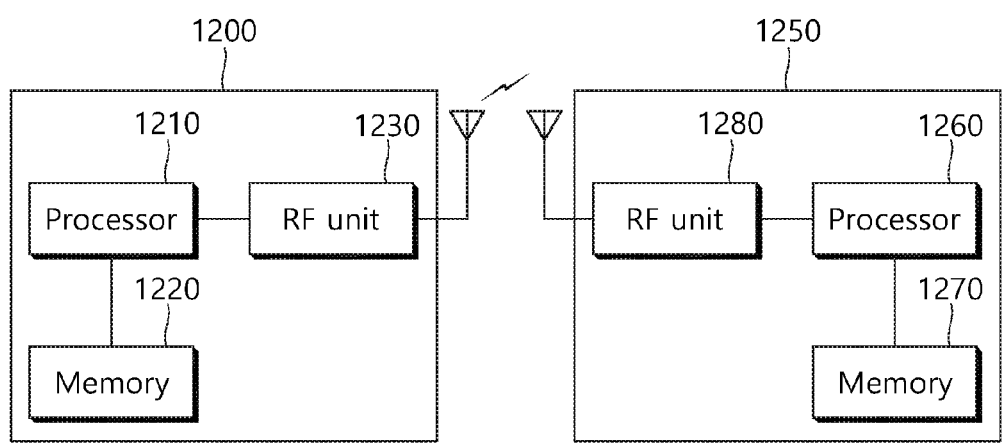
FIG. 12 illustrates a block diagram of a wireless device to which an embodiment of the present invention can be applied.

FIG. 12 illustrates a block diagram of a wireless device to which an embodiment of the present invention can be applied.

With reference to FIG. 12, a wireless device 1200 is an STA in which the embodiments described above can be implemented and can be an AP 1200 or a non-AP STA 1250.

The AP 1200 comprises a processor 1210, memory 1220, and Radio Frequency (RF) unit 1230.

The RF unit 1230, being connected to the processor 1210, can transmit/receive a radio signal.

The processor 1210 implements a function, process, and/or method proposed in the present invention. For example, the processor 1210 can be implemented to perform the operation of a wireless device according to the embodiment of the present invention described above. The processor can perform the operation of a wireless device disclosed in the embodiment of FIGS. 2 to 11.

For example, the processor can be configured to transmit a downlink frame to an STA through a downlink-oriented channel and to receive an uplink frame from the STA through an uplink-oriented channel or a legacy channel. The processor 1210 can be configured to perform inter-channel switching by transmitting an uplink polling frame or a downlink polling frame.

The STA 1250 comprises a processor 1260, memory 1270, and RF unit 1280.

The RF unit 1280, being connected to the processor 1260, can transmit/receive a radio signal.

The processor 1260 implements a function, process, and/or method proposed in the present invention. For example, the processor 1260 can be implemented to perform the operation of a wireless device according to the embodiment of the present invention described above. The processor can perform the operation of a wireless device disclosed in the embodiment of FIGS. 2 to 11.

For example, the processor 1260 can be configured to receive the downlink frame through a downlink-oriented channel and to transmit a response frame with respect to the downlink frame through the downlink-oriented channel. The downlink-oriented channel allows only the AP's contention-free transmission of the downlink frame and the STA's transmission of the response frame; and restricts the STA's transmission of an independent uplink frame, where the independent uplink frame can be an uplink frame rather than a response frame among the uplink frames transmitted to the AP from the STA.

The processor 1210, 1260 can comprise Application-Specific Integrated Circuit (ASIC), other chipsets, logical circuit, data processing device and/or converter converting a baseband signal and a radio signal to and from each other. The memory 1220, 1270 can include Read-Only Memory (ROM), Random Access Memory (RAM), flash memory, memory card, storage medium and/or other storage devices. The RF unit 1230, 1280 can include one or more antennas transmitting and/or receiving a radio signal.

If an embodiment is implemented by software, the techniques described above can be implemented in the form of a module (process or function) which performs the function described above. A module can be stored in the memory 1220, 1270 and can be executed by the processor 1210, 1260. The memory 1220, 1270 can be located inside or outside the processor 1210, 1260 and can be connected to the processor 1210, 1260 through a well-known means.

What is claimed is:

1. A method for receiving a downlink frame in a WLAN, the method comprising:
   receiving, by a station (STA), the downlink frame from an Access Point (AP) through a downlink-oriented channel; and
   transmitting, by the STA, a response frame in response to the downlink frame to the AP through the downlink-oriented channel, wherein the downlink-oriented channel allows only contention-free transmission of the downlink frame by the AP and transmission of the response frame by the STA and restricts transmission of an independent uplink frame by the STA; and
   the independent uplink frame is an uplink frame rather than the response frame among uplink frames transmitted to the AP from the STA.

2. The method of claim 1, further comprising, if the STA. has a pending independent uplink frame, switching, by the STA. from the downlink-oriented channel to a non-downlink oriented channel; and
   transmitting by the STA, the independent uplink frame through the non-downlink oriented channel, wherein the non-downlink oriented channel allows transmission of the independent uplink frame by the STA.

3. The method of claim 2, further comprising transmitting, by the STA, to the AP a non- downlink oriented channel switching frame including information indicating switching to the legacy channel from the downlink-oriented channel, wherein the non-downlink oriented channel switching frame includes information about the STA'S duration time on the non- downlink oriented channel.

4. The method of claim 1, further comprising:
   switching, by the STA, to a non-downlink oriented channel from the downlink-oriented channel in case the STA receives an uplink polling frame from the AP; and
   transmitting, by the STA, to the AP the independent uplink frame polled on the basis of the uplink polling frame through the non-downlink oriented channel, wherein the non-downlink oriented channel allows transmission of the independent uplink frame by the STA.

5. The method of claim 4, further comprising:
   switching, by the STA, to the downlink oriented channel from the non-downlink oriented channel, wherein an independent uplink frame transmitted before the STA is switched to the downlink-oriented channel includes piggybacked channel switching information, and
   the channel switching information indicates channel switching to the downlink-oriented channel from the non-downlink oriented channel.

6. A station (STA) receiving a downlink frame in a WLAN, the STA comprising:
   a Radio Frequency (RF) unit for transmitting or receiving a radio signal; and
   a processor connected operatively to the RF unit, wherein the processor is configured
   to receive the downlink frame from an AP through a downlink-oriented channel; and
   to transmit a response frame in response to the downlink frame to the AP through the downlink oriented channel,
   wherein the downlink-oriented channel allows only contention-free transmission of the downlink frame by the AP and transmission of the response frame by the STA and restricts transmission of an independent uplink frame by the STA; and
   the independent uplink frame is an uplink frame rather than the response frame among uplink frames transmitted to the AP from the STA.

7. The STA of claim 6, wherein, if the STA has a pending independent uplink frame, the processor is configured to switch from the downlink-oriented channel to a non-downlink oriented channel; and
   to transmit the independent uplink frame through the non-downlink oriented channel,
   wherein the non-downlink oriented channel allows transmission of the independent uplink frame by the STA.

8. The STA of claim 7, wherein the processor is configured to transmit to the AP a non-downlink oriented channel switching frame including information indicating switching to the legacy channel from the downlink-oriented channel, wherein the non-downlink oriented channel switching frame includes information about the STA's duration time on the non-downlink oriented channel.

9. The STA of claim 6, wherein the processor is configured to switch the STA to a non-downlink oriented channel from the downlink-oriented channel in case the STA receives an uplink polling frame from the AP; and
to transmit to the AP the independent uplink frame polled on the basis of the uplink polling frame through the non-downlink oriented channel,
wherein the non-downlink oriented channel allows transmission of the independent uplink frame by the STA.

10. The STA of claim 9, wherein the processor is configured to switch to the downlink-oriented channel from the non-downlink oriented channel, wherein an independent uplink frame transmitted before the STA is switched to the downlink-oriented channel includes piggybacked channel switching information, and
the channel switching information indicates channel switching to the downlink-oriented channel from the non-downlink oriented channel.

* * * * *